United States Patent [19]

Reynolds, Jr.

[11] Patent Number: 5,799,984
[45] Date of Patent: Sep. 1, 1998

[54] CONDUIT CONNECTION

[75] Inventor: Russell T. Reynolds, Jr., St. Clair Shores, Mich.

[73] Assignee: ANR Manufacturing, Inc., St. Clair Shores, Mich.

[21] Appl. No.: 612,081

[22] Filed: Mar. 7, 1996

Related U.S. Application Data

[63] Continuation-in-part of Ser. No. 306,167, Sep. 14, 1994, Pat. No. 5,570,909, which is a continuation-in-part of Ser. No. 871,068, Apr. 20, 1992, abandoned.

[51] Int. Cl.$^6$ ............................................. F16L 35/00
[52] U.S. Cl. ............................ 285/38; 285/90; 285/317; 285/319; 285/383; 285/417; 285/906
[58] Field of Search ................................. 285/319, 902, 285/317, 340, 403, 383, 320, 195, 218, 90, 417, 404, 38, 906, 382, 194; 174/215 S, 60, 64, 65 R; 403/328, 329

[56] References Cited

U.S. PATENT DOCUMENTS

| | | |
|---|---|---|
| D. 305,041 | 12/1989 | Erickson . |
| D. 313,436 | 1/1991 | Erickson . |
| 414,686 | 11/1889 | Dinn ........................ 285/399 X |
| 1,473,362 | 11/1923 | Tilton ........................ 285/382 X |
| 1,770,115 | 7/1930 | Thomas, Jr. . |
| 1,799,941 | 4/1931 | Wulle ........................ 285/382 X |
| 1,831,856 | 11/1931 | Fullman ........................ 285/404 |
| 2,338,740 | 1/1944 | Smith . |
| 2,695,793 | 11/1954 | Minton ........................ 285/194 X |
| 3,079,182 | 2/1963 | Appleton ........................ 285/382 X |
| 3,174,776 | 3/1965 | Berger . |
| 3,223,439 | 12/1965 | Stevens . |
| 3,402,947 | 9/1968 | Lewis . |
| 3,454,291 | 7/1969 | Goldsobel et al. . |
| 3,498,645 | 3/1970 | Kowalewski et al. . |
| 3,662,087 | 5/1972 | Singletary . |
| 3,669,475 | 6/1972 | Luckenbill et al. . |
| 4,067,534 | 1/1978 | Frey . |
| 4,073,514 | 2/1978 | Pate . |
| 4,438,954 | 3/1984 | Hattori . |
| 4,819,974 | 4/1989 | Zeidler . |
| 5,046,982 | 9/1991 | Erickson . |
| 5,094,481 | 3/1992 | Takikawa et al. . |
| 5,120,085 | 6/1992 | Shin . |
| 5,171,164 | 12/1992 | O'Neil et al. . |
| 5,266,050 | 11/1993 | O'Neil et al. . |

FOREIGN PATENT DOCUMENTS

| | | |
|---|---|---|
| 96321 | 7/1960 | Norway . |
| 103241 | 1/1964 | Norway . |
| 435887 | 10/1967 | Switzerland . |
| 415199 | 8/1934 | United Kingdom . |

OTHER PUBLICATIONS

Flex–Plus © Blue © Ent (Electrical Nonmetallic Tubing), Fittings and Accessories, Carlon Electrical Products, Cleveland, Ohio. © Carlon 1993.

Primary Examiner—Dave W. Arola
Attorney, Agent, or Firm—Harness, Dickey & Pierce, P.L.C.

[57] ABSTRACT

A connector for a rigid electrical conduit has an internal cylindrical socket sized to snugly receive the end of the conduit. A spring leaf detent is externally mounted on the connector body, with a free end of the leaf extending through a slot in the connector body side wall. Inserting a conduit into the socket deflects the spring leaf away from the socket axis, thereby generating a resilient stress in the leaf that enables the free end of the leaf to exert a gripping action on the conduit. The grip action can be removed by unloosening a screw that is used to mount the leaf spring on the connector body.

18 Claims, 4 Drawing Sheets

CONDUIT CONNECTION

CROSS-REFERENCE TO RELATED APPLICATION

This application is a continuation-in-part of U.S. patent application Ser. No. 08/306,167, filed Sep. 14, 1994, now U.S. Pat. No. 5,570,909, which is a continuation-in-part of U.S. patent application Ser. No. 07/871,068, filed Apr. 20, 1992, now abandoned.

FIELD OF INVENTION

This invention relates to connectors for electrical conduit, especially connectors for rigid tubular electrical conduit formed of thin wall aluminum tubing or composite materials.

PRIOR DEVELOPMENTS

In commercial and residential building construction, flexible electrical wiring is often run through rigid metal tubing (or conduit) that extends between junction boxes and various wall outlets. Such conduit commonly is supplied in 10 foot lengths that must be cut to shorter lengths to meet individual job requirements. When the distance between the junction box and the wall box is greater than 10 feet, two or more conduit sections are connected together to form a continuous shield for the electrical cable (wiring) running within the conduit.

Connectors are required to connect the conduit sections to the boxes, and to connect the conduit sections to each other. Such connectors commonly comprise a tubular socket member sized to snugly accommodate the end of a conduit section. A set screw is threaded transversely through the wall of the socket member to engage the conduit wall, thereby locking the conduit against removal.

A connector used to connect two conduit sections together has two set screws, one for each conduit. The conduit sections are inserted into opposite ends of the connector body. Also, the connector has an internal annular shoulder located midway between the connector ends. Each conduit is inserted into the connector until it abuts the shoulder at approximately the mid line of the connector body. Typically, the connector has a length of about two inches, and an internal socket diameter of about seven-eighth inch (the external diameter of the conduit). It will be appreciated that the connector socket diameter could easily be made greater or less than about seven-eighth inch to thus accommodate conduits of varying diameters.

A connector used to connect a conduit section to an electrical box has only one set screw. The connector end is threaded for insertion through a knockout opening in the box wall. A lock washer and nut are screwed onto the threaded end of the connector to rigidly join the connector to the box.

With conventional connectors, the electrical conduit sections can be locked to the connector only by tightening the set screw (or screws) carried on the connector body. If the electrician forgets to tighten the set screw, the conduit section is loosely attached to the socket connector. The conduit may pull out of the connector during subsequent work on the system, or at some later point in time.

In addition, an individual conduit section is 10 feet long. While the electrician is positioning and clamping the conduit in place against the rafters or studs, the end of the conduit may slip out of the socket connector body. Also, the electrician has to remember to return with his ladder to the connector to tighten the set screw after the conduit is in place. Such back and forth movement is time consuming.

U.S. Pat. No. 3,402,947 to A. D. Lewis proposes a connector construction apparently designed for use with electrical tubular conduits, such that insertion of a conduit into the connector body automatically locks the conduit to the connector. The connector utilizes an internal tiltable annular locking plate that takes an oblique position across the socket space to grip the inserted end of the conduit.

The Lewis connector is advantageous in that the conduit locking action is automatic. The electrician does not have to manually turn a set screw or other similar locking element in order to rigidly lock the conduit section to the connector body. However, the Lewis connector design might in some cases be unsatisfactory, due to the way in which the connector is constructed.

The Lewis connector includes an elongated thin-walled tubular element that extends beyond the connector body. An inturned annular flange on the end of the tubular element provides an opening for receiving the end of the conduit section. The internal diameter of the tubular element is considerably larger than the conduit diameter. If the conduit is inserted at an oblique angle to the socket axis, the end of the conduit may not be able to properly align with the opening in the annular locking plate or the socket in the connector body.

Electrical conduit sections are relatively long and cumbersome to handle. Inserting the conduit into the Lewis connector might prove difficult in some situations, due to the clearance spaces and hole alignment required between the Lewis flange, locking plate and socket surface.

Another drawback of the Lewis connector construction is a relatively high manufacturing cost. The connector requires a central connector body, an elongated flanged tubular element, and two annular locking plates. Each locking plate has a specially constructed spring brazed or otherwise secured to one of its faces. In order to captively retain the locking plates within the connector, the flanges on the thin-walled tubular element have to be formed after the locking plate has been installed in the connector. The Lewis connector structure is thought to be a relatively costly device in relation to the function served by the device.

SUMMARY OF THE INVENTION

The present invention relates to a relatively low-cost connector device designed to automatically hold and retain an electrical conduit when the conduit is inserted into the connector body. In a preferred embodiment of the connector device, a spring leaf detent is mounted on an external surface of a body of the connector. A free end portion of the detent extends through a slot in a sidewall connector body. When an electrical conduit is inserted into the connector body, the free end of the detent allows the conduit to be inserted. Once the conduit is fully inserted, the detent is secured to the body of the connector and the spring force provided by the spring leaf detent causes an edge portion of the spring leaf detent to grip and retain the conduit in its inserted position.

The detent includes a flat mounting portion that seats on a raised boss on the connector body. A mounting screw extends through the detent into the boss, thereby clamping the detent to the connector body. The detent extends angularly away from its mounting portion through the slot in the connector body to a position in the path of motion of the conduit.

The detent can be disengaged from the conduit by unloosening the clamping screw a slight amount, e.g. less than one half revolution.

One advantage of the connector of this invention is a relatively low manufacturing cost. The cost of manufacture is only slightly higher than the manufacturing cost of conventional connectors.

In an alternative preferred embodiment, the detent comprises a piston having an edge portion which extends through an opening in the connector body. The piston is biased by a spring which is captively maintained by a threaded screw.

In yet another alternative preferred embodiment, the present invention employs a plurality of pairs of bosses disposed on the connector approximately 180° apart from one another. Each boss includes its own spring leaf detent. In this manner, a gripping force can be applied to opposing sides of each one of a pair of ends of conduits once each end of each conduit is inserted within the connector body.

In yet another alternative preferred embodiment of the present invention, the spring leaf detent is formed from a single piece of spring steel to operate with a pair of boss portions to secure two independent conduits within the connector body.

In still yet another alternative preferred embodiment of the present invention, a pair of boss portions and associated pair of spring leaf detents is included and disposed in longitudinal alignment along the connector body to provide an even more secure gripping force to one end of one conduit inserted within the connector body.

In still another alternative preferred embodiment of the present invention, the spring leaf detent comprises an integrally formed portion of the connector body. In this embodiment, there is no set screw needed to maintain the spring leaf detent in its operative position.

In still another alternative preferred embodiment of the present invention, the connector body forms a "ring" having pairs of opposing leaf portions formed by cutting or punching out generally square-shaped proportions of the connector body, such that such portions form flaps which extend into the area defined by the body portion. When the flaps are formed such that each pair of flaps is 180° opposed to each other, and further such that all four flaps are directed towards the longitudinal center of the connector body. In this embodiment, a locking action is effected simply by inserting the ends of two sections of conduits into the connector body from opposite sides of the connector body.

In yet another alternative preferred embodiment of the present invention, the connector body includes pairs of raised boss portions and spring leaf detents wherein the spring leaf detents are arranged at positions approximately 90° apart from one another about the circumference of the connector body for providing an even stronger gripping force on at least one end of a section of conduit.

In still another alternative preferred embodiment, a connector is formed using a plurality of spring leaf detents and raised boss portions arranged longitudinally along a body of the connector. The connector is specifically adapted to be threadably secured to another member and to accept and latchingly engage an end of a conduit to thereby secure the conduit to the other member.

BRIEF DESCRIPTION OF THE DRAWINGS

The various advantages of the present invention will become apparent to one skilled in the art by reading the following specification and subjoined claims and by referencing following drawings in which:

DETAILED DESCRIPTION OF THE PREFERRED EMBODIMENTS

Figures 1, 2, 3, 4, 5:
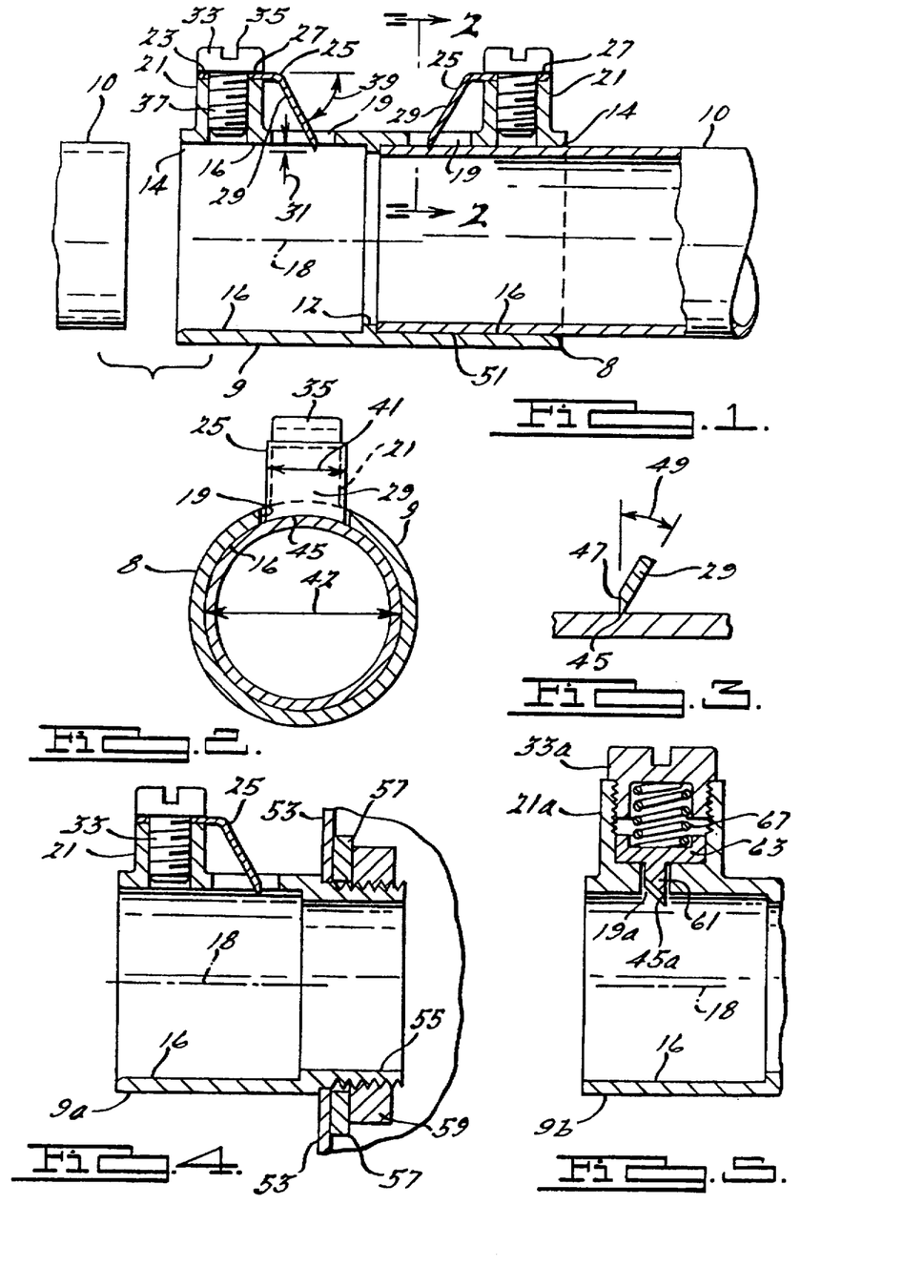
FIG. 1 is a sectional view taken through a connector constructed according to the invention.
FIGS. 2 is a transverse sectional view taken on line 2—2 in FIG. 1.
FIG. 3 is a fragmentary enlarged view of a structural detail used in the FIG. 1 construction.
FIG. 4 is a sectional view taken in the same direction as FIG. 1, but illustrating another form of the invention.
FIG. 5 is a sectional view through another connector embodying features of the invention.

Referring to FIGS. 1 and 2, a connector 8 in accordance with a preferred embodiment of the present invention is shown for splicing or connecting two rigid electrical conduits 10a, 10b together. In practice, each electrical conduit 10 is an elongated, cylindrical thin wall tube having a length of approximately ten feet and an external diameter of about 0.875 inch. It will be appreciated that the present invention can be easily modified to allow it to couple a wide variety of conduit diameters.

Connector 8 comprises an annular connector body 9 having an internal annular rib 12 located midway between its opposite ends. The rib forms two oppositely facing shoulders that define the fully inserted position of the conduit into the connector body. Each end of the connector body forms an opening 14 for receiving the end of an electrical conduit 10 when the conduit is inserted into a socket defined by an internal cylindrical socket surface 16. The diameter of socket surface 16 is only slightly greater than the external diameter of conduit 10 with the outer surface on the conduit 10 conforming with the inner surface of the connector 8 so that when the conduit is fully inserted into the socket (to abut against rib 12), there is essentially no play between the conduit and the connector body. Cylindrical socket surface 16 defines a socket axis 18.

The outer surface of the conduit 10 and the interior surface of the connector 8 have mating correspondence in a number of planes perpendicularly intersecting the axis 18 along the length of the axis 18. The complete mating correspondence occurring in one such plane is illustrated in FIG. 2. Accordingly, complete mating correspondence is provided substantially throughout the cylindrical interface between the circumferential outer surface of conduit 10 and the connector 8 along the axis 18. As will be appreciated by those skilled in the art, the above described mating correspondence provides significant advantages relating to conductance for grounding purposes, elimination of any drop in potential across the interface, and satisfaction of U.L. requirements relative to pullout strength.

Connector body 9 includes a sidewall having a rectangular slot 19 located between internal rib 12 and each opening 14. An external boss 21 is formed as an integral part of the connector body to provide a raised flat side surface 23 extending generally parallel to socket axis 18, as viewed in FIG. 1. Boss 21 constitutes a mounting mechanism for a leaf spring 25, preferably formed out of spring steel with a thickness of about 0.03 inch. The leaf spring includes a flat mounting portion 27 seated on mounting surface 23, and a flat resilient, deflectable arm portion 29 extending angularly from mounting portion 27 through slot 19 into the space circumscribed by cylindrical socket surface 16. When conduit 10 is removed from the connector body, the free end of spring arm portion 29 projects inwardly beyond socket surface 16 by a distance 31 that measures about 0.02 inch.

A mounting screw 33 has a head 35 overlying the flat mounting portion 27 of the spring 25, and a threaded shank 37 extending into a threaded hole in boss 21. The screw serves to rigidly clamp the spring to boss 21. Alternatively, it is contemplated that a rivet or other equivalent means for rigidly clamping spring 25 to boss 21 may be used. Flat arm portion 29 of the spring is capable of being deflected away from socket axis 18, as by insertion of a conduit 10 into the socket. Arm portion 29 of the spring is bent with respect to mounting portion 27 by an angle 39 that measures about 60°.

In practice, connector body 9 is preferably formed from a continuous coil of two (2) inch wide, substantially flat, steel stock having a thickness within the range of 0.030 inch to 0.100 inch and, more particularly, having a thickness of 0.050 inch. A connector body 309, manufactured from the preferred stock and similar to that shown in FIGS. 1 and 2 and described above, is shown in FIGS. 15 and 16. Slots 319 are die cut and bosses 321 and internal rib 312 are formed in the steel stock at the appropriate locations. As will be appreciated by those skilled in the art, slots 319, bosses 321 and internal rib 312 may be formed in a single or progressive die steps. Preferably, boss 321 is formed to an elevation within the range of 0.100 inch to 0.500 inch based upon the thickness of the stock. More particularly, the preferred elevation of boss 321 is 0.200 inch for 0.050 inch stock. After forming slot 319, internal rib 312, and boss 321, the cylindrical configuration of connector body 9 is preferably established by severing the appropriate length of stock, rolling the flat stock, and seam welding the free ends thereof to one another. While the specific dimensions and manufacturing techniques recited herein are provided to assist one skilled in the art to make and use the present invention, it will be appreciated that a variety of dimensions and manufacturing techniques may be used to produce connectors of varying sizes without departing from the scope of the invention described and claimed herein.

Figure 15:
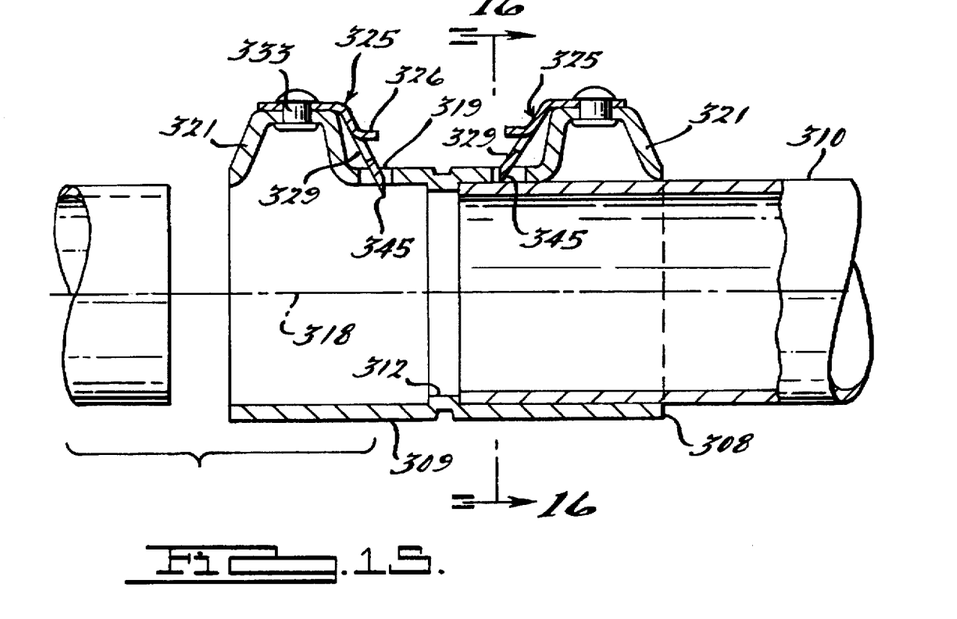
FIG. 15 is a sectional view taken in the same direction as FIG. 1, but illustrating another alternative embodiment of the present invention.
Figure 16:
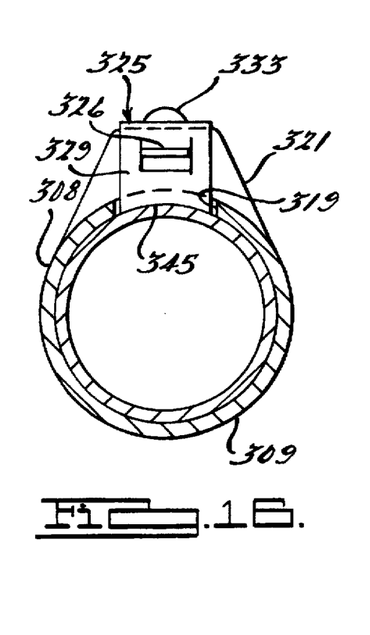
FIG. 16 is a transverse sectional view taken on line 16—16 in FIG. 15.

As will be appreciated by those skilled in the art, when connector 308 is manufactured from substantially flat steel stock in the manner previously described, the wall thickness of boss 321 is insufficient to accommodate the formation of internal threads. Accordingly, as shown in FIG. 15, a rivet 333 is used to rigidly clamp spring 325 to boss 321. Spring 325 is provided with a tab 326 projecting from arm portion 329 to allow removal of the detent action of spring 325 by inserting a prying member such as a screwdriver between tab 326 and connector body 309 and urging tab 326 away from longitudinal axis 318 thereby facilitating the removal of conduit 310 from the socket. Specifically, tab 326 is preferably formed in spring 325 by die cutting arm portion 329 and bending tab 326 to project from arm portion 329 for a length sufficient to allow the insertion of the prying member. It should be appreciated by those skilled in the art that the following description of the structure and operation of the connector 8 shown in FIGS. 1–3 also generally applies to the connector 308 shown in FIGS. 15 and 16.

As best seen in FIG. 2, spring 25 has a width dimension 41 that is almost as great as the transverse width dimension of slot 19. The spring can deflect without interference from slot 19. At the same time, the spring has a relatively large width dimension 41 that is approximately 40% of the socket surface diameter, referenced by numeral 42 in FIG. 3. The large width dimension 41 enables the spring to have a relatively long contact edge 45 for engaging conduit 10.

As seen in FIG. 2, the free end edge of spring 25 is curved in the major plane of the spring to conform to the surface contour on conduit 10. Edge 45 of the spring thus has an extensive engagement with the conduit surface. As seen in FIG. 3, the free end of the spring has a sharpened "V" shape to present a sharpened thin edge to the conduit surface. Edge 45 exerts a knife-like action on the conduit surface, partially penetrating the conduit surface.

Sharpened edge 45 is defined by a straight edge surface 47 extending at an angle 49 to the planes of the spring major faces. Angle 49 measures about 30°. The angle of arm portion 29 to mounting portion 27 is such that edge surface 47 extends approximately normal to socket axis 18, as seen in FIG. 1.

During the insertion of conduit 10 into the socket, the conduit contacts edge 45 of the spring, thereby deflecting the spring away from socket axis 18. The arm portion 29 of the spring is thereby resiliently stressed so that edge 45 of the spring slides along the conduit until it is fully inserted in the connector. Edge 45 penetrates the conduit surface to a slight extent in reaction to a small withdrawal of the conduit from its inserted portion. Of equal importance, the spring forces the conduit into locking engagement with the socket surface 16 located directly across from edge 45. In FIG. 1, this area is designated by numeral 51. Any force tending to pull the conduit out of the socket is effectively resisted by spring 25. The spring acts as a resilient detent holding the conduit in the socket.

The detent action of spring 25 is automatic, i.e, the spring automatically grips the conduit when the conduit is inserted into the socket. However, the detent action can be removed by slightly loosening screw 33. When the screw is loosened about 0.01 inch measured on the screw axis, the spring is loosened wherein arm portion 29 of the spring can tilt around the screw axis in a direction away from the socket axis 18. Conduit 10 can then be readily removed from the socket. Alternatively, in the preferred embodiment illustrated in FIGS. 15 and 16 and previously described herein, spring edge 345 can be disengaged from conduit 10 by prying against tab 326.

Screw 33 preferably has a relatively coarse thread, i.e. 24 threads per inch. With such a thread size, the screw needs to be loosened less than one half turn in order to obtain the necessary spring looseness for pulling the conduit out of the socket.

FIG. 1 shows the invention applied to a connector designed for splicing or connecting two electrical conduits together. FIG. 4 shows the invention applied to a connector designed to attach a rigid electrical conduit to a junction box. In FIG. 4, numeral 53 represents one wall of the junction box. An end portion of the connector body 9a is threaded, as at 55, to receive a lock nut (or lockwasher) 57 and threaded nut 59. With the connector body fastened to the junction box, the connector body is in condition to receive the end of a conduit, whereby the conduit is effectively attached to the junction box. The connection provides an uninterrupted continuous shielding of the electrical cable that runs from the box within the rigid conduit.

FIG. 5 shows another possible construction that might be used in practicing the invention. In this case, the spring detent means comprises a rigid, sharp edge knife element 61 having a transversely curved sharp edge 45a conforming to the surface contour on the cylindrical conduit (not shown in FIG. 5). Knife element 45a extends from a cylindrical piston 63 through a rectangular slot 19a in the sidewall of connector body 9b.

Piston 63 is slidably positioned within a cylindrical pocket in a protruding boss 21a. A screw 33a is threaded into a threaded hole in the boss to engage a compressed coil spring 67. The spring resiliently urges piston 63 and the knife element 45a toward slot 19a.

When a conduit is inserted into the socket, knife element 45a is deflected away from socket axis 18. Spring 67 then causes knife element 45a to exert a clamp force on the conduit. The action is approximately the same as the clamp action of leaf 25 used in the embodiments of FIGS. 1 and 4.

By loosening screw 33a a prescribed amount, it is possible to completely remove the force of coil spring 67 on piston 63, whereby the conduit can be pulled out of the socket. Spring 67 is preferably a high rate spring that can be deactivated by a comparatively small axial unloosening motion of screw 33a. FIG. 5 represents an alternative preferred form of the invention.

Figure 6:
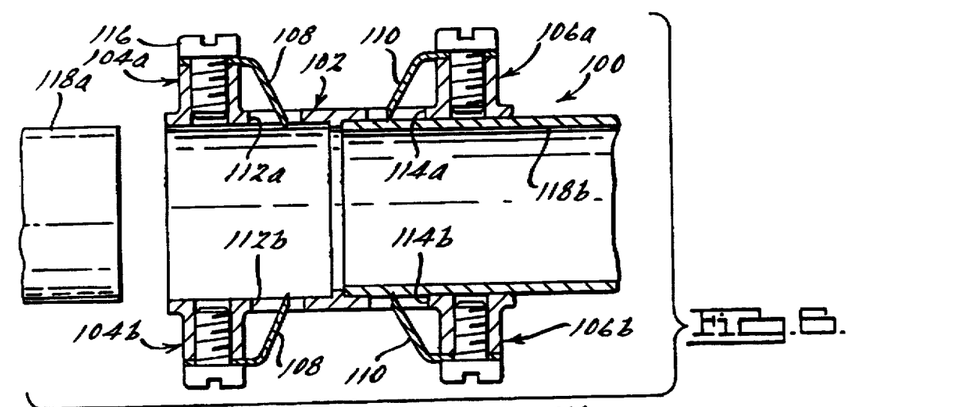
FIG. 6 is a side cross-sectional view of a coupling in accordance with an alternative preferred embodiment of the present invention showing a coupling including two pairs of spring leaf detents, with each pair of spring leaf detents being arranged 180° apart from one another on the connector body.

Referring now to FIG. 6, an alternative preferred embodiment 100 of the present invention is shown. The embodiment 100 represents a coupling which includes a body portion 102 having a first pair of raised boss portions 104a and 104b, and a second pair of raised boss portions 106a and 106b. The boss portions 104a and 104b are positioned approximately 180° from one another about the circumference of the body portion 102. Similarly, the raised boss portions 106a and 106b are positioned approximately 180° from one another about the circumference of the body portion 102. Each of the raised boss portions 104a, 104b includes a spring leaf detents 108 while each of the raised boss portions 106a, 106b includes separate spring leaf detents 110. The spring leaf detents 108 project through slots 112a and 112b which are also positioned approximately 180° from one another about the circumference of the body portion 102. Likewise, a second pair of slots 114a and 114b are formed longitudinally in line with the spring leaf detent 110 and positioned about 180° apart from one another about the circumference of the body portion 102. Set screws 116 secure each of the spring leaf detents 108 and 110 to their respective boss portions 104 and 106. In this manner, an even greater gripping action can be provided on a pair of conduits 118a and 118b when each are inserted from opposite sides into the coupling 100. Each pair of spring leaf detents 108 and 110 serve to grip their associated conduit 118a or 118b on opposite circumferential sides of the conduit 118a or 118b, to thus provide approximately double the gripping strength over that provided by, for example, the embodiment of FIG. 1.

Figure 7:
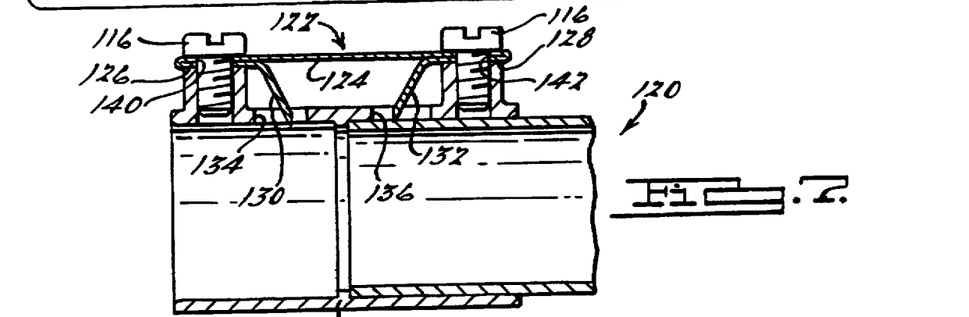
FIG. 7 is a cross-sectional side view of another alternative preferred embodiment showing a single piece spring leaf detent.
Figure 8:
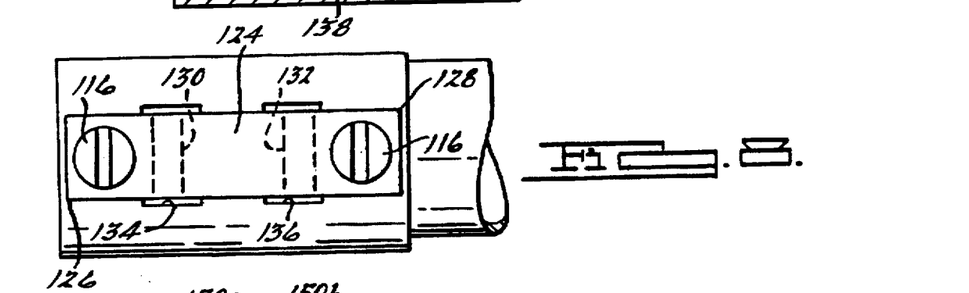
FIG. 8 is a plan view of the coupling shown in FIG. 7.

Referring now to FIGS. 7 and 8, an alternative preferred embodiment 120 of the coupling shown in FIG. 1 is illustrated. In this embodiment 120, a spring leaf detent 122 is formed from a single piece of material, such as spring steel. The single leaf detent 122 includes a central portion 124, a first end portion 126 folded back against a section of the central portion 124, and a second end portion 128 folded back against another section of the central portion 124. The first end portion 126 includes a depending arm portion 130 and a second end portion 128 includes a depending arm portion 132. Depending arm portion 130 is adapted to extend through a slot 134 and depending arm portion 132 is adapted to extend through a slot 136. The slots 134 and 136 are further formed in general, longitudinal alignment with one another along a main body portion 138. The central portion 124 is further secured by set screws 116 which extend through aligned apertures 140 and 142 in the central portion 124.

Figure 9:
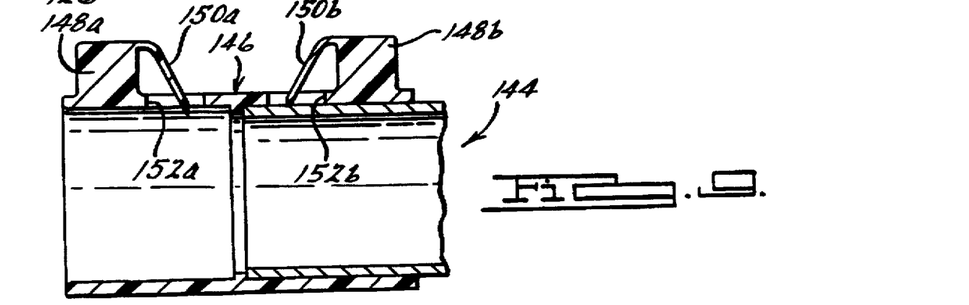
FIG. 9 is a side cross-sectional view of another alternative preferred embodiment showing the spring leaf detents integrally formed with the connector body.

Referring now to FIG. 9, a coupling 144 in accordance with yet another alternative preferred embodiment of the present invention is illustrated. The coupling 144 includes a main body portion 146 having a pair of integrally formed, raised boss-like portions 148a and 148b. The boss-like portion 148a includes an integrally formed, depending arm portion 150a, while the boss-like portion 148b includes an integrally formed, depending arm portion 150b. The depending arm portions 150a and 150b are adapted to extend through aligned slots 152a and 152b, respectively, formed in the main body portion 146. Accordingly, the coupling 144 comprises a single, integrally formed component which may couple the ends of two sections of conduit together without the need for the set screws 116 described in connection with FIGS. 6–8. The coupling 144 is preferably molded from a suitable, high strength plastic.

Figures 10, 11:
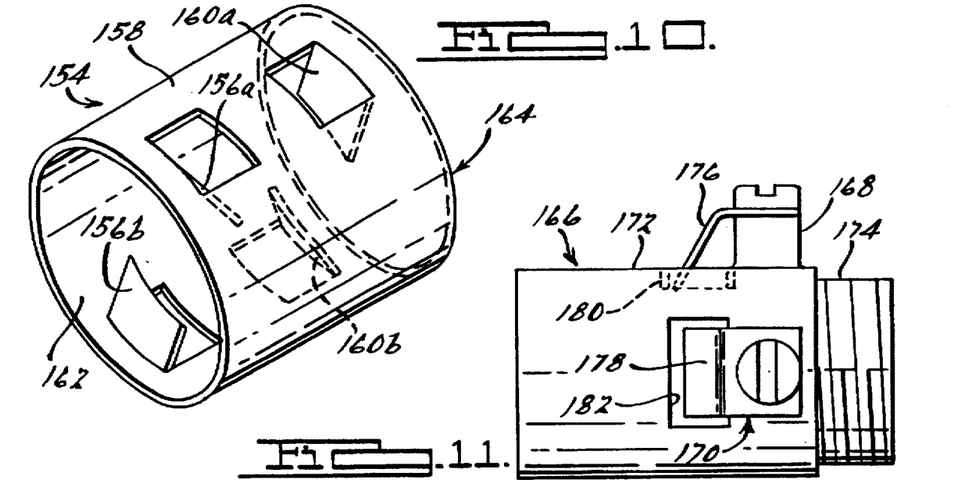
FIG. 10 is a prospective view of another alternative preferred embodiment of the present invention in the form of a ring coupling having spring leaf detents formed by punched out portions of the coupling body itself.
FIG. 11 is a side view of an alternative preferred embodiment of the present invention showing a connector having two spring leaf detents positioned at 90° about the circumference of a body portion of the connector.

Referring now to FIG. 10, another coupling 154 is shown in accordance with another alternative preferred embodiment of the present invention. The coupling 154 forms a "ring" having a first pair of opposing, depending arm portions 156a and 156b formed from punched out portions of a main body portion 158. A second opposing pair of depending arm portions 160a and 160b is formed from punched out portions of the main body portion 158. The arm portions 156a and 156b are further formed so as to be positioned approximately 180° apart from one another about the circumference of the main body portion 158. Similarly, the arm portions 160a and 160b are formed so as to be positioned approximately 180° from one another about the circumference of the main body portion 158, and further in longitudinal alignment with the arm portions 156a and 156b. The arm portions 156a and 156b are further formed so as to project towards the longitudinal center of the main body portion 158. Likewise, the arm portions 160a and 160b are also formed so as to project inwardly towards the longitudinal center of the main body portion 158. Thus, when a conduit is inserted into a first end, denoted by reference numeral 162, of the coupling 154, the end of the conduit engages the arm portions 156a and 156b and is thereafter maintained securely within the main body portion 158 by the biasing force provided by the arm portions 156a and 156b. Similarly, when an end of a second section of conduit is inserted from the opposite end, denoted by reference numeral 164, of the coupling 154, the arm portions 160a and 160b engage the conduit and prevent the conduit from being withdrawn from the coupling 154. It will be appreciated that the coupling 154 is preferably manufactured from a suitable spring steel which provides the arm portions 156a, 156b and 160a, 160b with a suitable degree of resiliency, to thereby enable each to provide a biasing force against the conduit with which it is in contact with.

Referring now to FIG. 11, yet another connector 166 is shown in accordance with yet another alternative preferred embodiment of the present invention. The connector 166 includes a first raised boss portion 168 and a second raised boss portion 170 positioned approximately 90° from the first boss portion 168 about a main body portion 172 of the connector 166. The connector includes a threaded end portion 174 which allows it to be coupled to a separate member (not shown). The boss portion 168 includes its own spring leaf detent 176 and the boss portion 170 includes a separate spring leaf detent 178. The spring leaf detent 176 extends through a slot 180 formed in the main body portion 172, and the spring leaf detent 178 extends through a slot 182 formed in the main body portion 172 approximately 90° from the slot 180. In this manner, the connector 166 can provide approximately double the gripping force to an end of a conduit.

Figure 12:
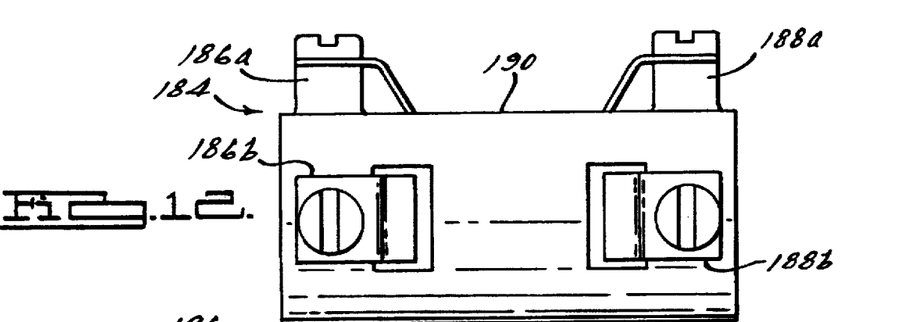
FIG. 12 is a side elevational view of yet another alternative preferred embodiment of the present invention showing a coupling having spring leaf detents positioned at approximately 90° apart from one another about the body of the coupling.

Referring now to FIG. 12, another coupling assembly 184 in accordance with yet another alternative preferred embodiment is shown. The coupling assembly 184 is identical to that shown in FIG. 6 with the exception that each pair of raised boss portions 186a,186b and 188a,188b are positioned approximately 90° apart from one another about the main body portion 190 of the coupling assembly 184.

Figures 13, 14:
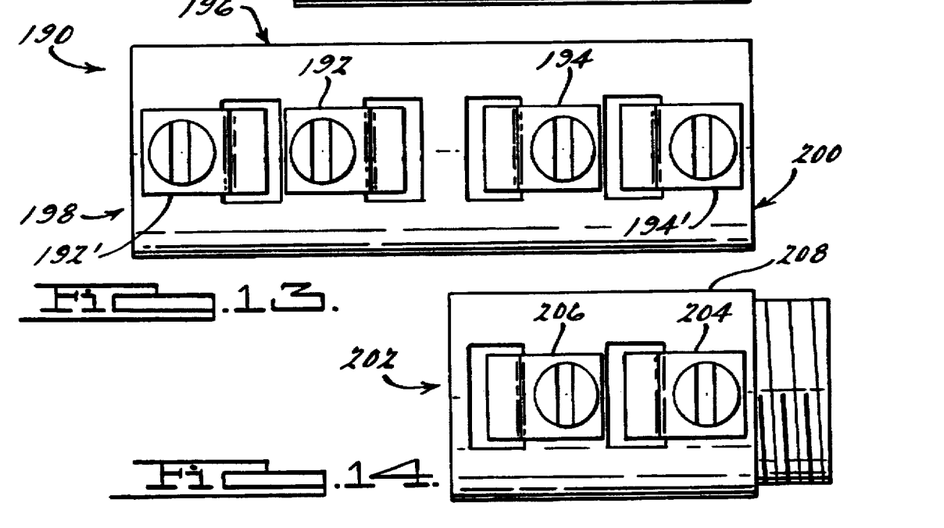
FIG. 13 is a plan view of an alternative preferred embodiment of the present invention showing a coupling including a pair of spring leaf detents positioned longitudinally in line along a body portion of the coupling, and being adapted to even more securely hold large diameter conduits.
FIG. 14 is an alternative preferred embodiment of the connector shown in FIG. 11 showing an additional spring leaf detent positioned longitudinally in line with the first spring leaf detent to provide an even stronger securing force on a conduit inserted into the connector.

Referring to FIG. 13, yet another coupling assembly 190 in accordance with another alternative preferred embodiment is shown. The coupling assembly 190 is identical to the construction of the coupling 8 shown in FIG. 1, with the exception that instead of one raised boss portion 192 and 194 disposed on opposite halves of a connector body 196, a second raised boss portion 192' and 194' are included longitudinally in line with the raised boss portions 192 and 194. In this manner, approximately double the gripping strength can be provided to each conduit inserted in the ends 198 and 200 of the coupling assembly 190.

Referring now to FIG. 14, a connector assembly 202 in accordance with an alternative preferred embodiment of the connector 166 shown in FIG. 11. The connector assembly 202 is identical to the connector assembly 166 with the exception that first and second raised boss portions 204 and 206, respectively, are positioned longitudinally in line with one another on a body portion 208 of the connector assembly 202. The construction of the connector assembly 202 is otherwise identical to connector 166 shown in FIG. 11.

Figure 17:
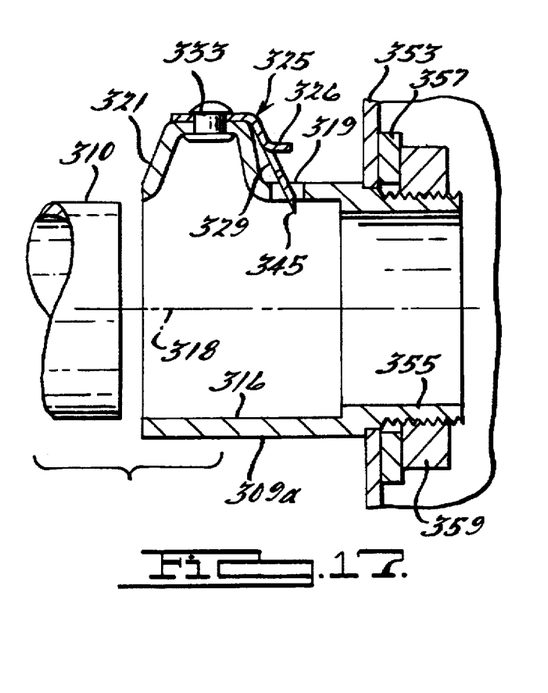
FIG. 17 is a sectional view taken in the same direction as FIG. 15, but illustrating another form of the invention.

FIG. 17 illustrates the invention in a similar manner to that of FIG. 4 wherein the invention is applied to a connector designed to attach a rigid electrical conduit to the junction box. In FIG. 17, numeral 353 represents one wall of the junction box. An end portion of the connector body 309a is threaded as at 355, to receive a lock nut (or lock washer) 357 and threaded nut 359. With the connector body fastened to the junction box, the connector body is in condition to receive the end of a conduit, whereby the conduit is effectively attached to the junction box. The connection provides an uninterrupted continuous shielding of the electrical cable that runs from the box within the rigid conduit.

Those skilled in the art can now appreciate from the foregoing description that the broad teachings of the present invention can be implemented in a variety of forms, while maintaining the conformance of the outer surface of the conduit with the inner surface of the connector in at least one plane. Therefore, while this invention has been described in connection with particular examples thereof, the true scope of the invention should not be so limited since other modifications will become apparent to the skilled practitioner upon a study of the drawings, specification and following claims.

What is claimed is:

1. A method for securing a conduit to a member having an inner surface defining an opening for receiving said conduit, said member further comprising flexible locking means for locking said conduit to said member manually engageable from the exterior of said member and communicating with the interior of said member by means of a slot through said member, said locking means being controlled by adjustable control means for engagement and disengagement of said member with said conduit, said adjustable control means being engageable to move either toward or away from said member, said method comprising:

inserting the conduit into the member so that the outer surface of said conduit matingly corresponds to the inner surface of the member substantially throughout the circumference of the conduit;

engaging said adjustable control means to move relative to said member to urge said flexible locking means to biasingly contact and exert a resilient detent upon said conduit; and     disconnecting said conduit from said member solely by disengagement of said adjustable controls means to move relative to said member to disengage said flexible locking means from said conduit.

2. The method of claim 1, wherein said flexible locking means includes a leaf spring having a flat planar mounting portion and an arm portion and wherein the step of engaging said adjustable control means includes engaging said adjustable control means to move relative to said member and urge said flat planar mounting portion to directly contact said member whereby said arm portion biasingly contacts said conduit.

3. A connector into which a rigid tubular electrical conduit having a smooth exterior surface can be secured, comprising:

an annular socket member that includes a tubular sidewall having an external surface and an internal cylindrical surface defining a socket axis, said internal surface being adapted to have a slidable fit with a tubular electrical conduit inserted into the socket member and to conform matingly with the exterior surface of said tubular electrical conduit throughout the circumference of both surfaces;

a slot formed in said tubular wall;

a mounting area on the external surface of the tubular wall;

a securement device; and a spring leaf detent being secured to said mounting area by said securement device, said spring leaf detent extending through said slot and being engageable with any point along the smooth exterior surface of said conduit.

4. The connector of claim 3 wherein said spring leaf detent includes a flat planar mounting portion seated on said mounting area on said external surface and a second integral deflectable planar portion extending angularly from said flat planar mounting portion through said slot for engaging an electrical conduit inserted into the socket member by means of the fixed securement of said detent to said external surface by said securement device.

5. The connector of claim 4 wherein said spring leaf detent further includes a tab projecting from said second integral deflectable planar portion.

6. The connector of claim 4 wherein said flat planar mounting portion is secured directly to said mounting area on said external surface by said securement device.

7. A connector into which a tubular electrical conduit can be secured, comprising:

an annular socket member that includes a tubular sidewall having an exterior surface and an internal cylindrical surface defining a socket axis, said internal surface being adapted to have a slidable fit on a tubular electrical conduit inserted into the socket member, wherein mating correspondence exists between the outer surface of said electrical conduit and the internal surface of said connector in at least one plane perpendicularly intersecting said socket axis and substantially throughout the length of the socket member axis correspondent with the axis of the electrical conduit;

a slot formed in said tubular wall;

a mechanism to biasingly engage and exert a resilient detent between said conduit and said annular socket member together, said mechanism including a first portion secured to said external surface of said socket member and a second portion extending through said slot and being movable between an engaged position wherein said second portion biasingly contacts said conduit and a disengaged position wherein said second portion is disengaged from said conduit; and a securement device securing said first portion of said mechanism to said exterior surface of said socket member.

8. The connector of claim 7 wherein said socket member includes a raised mount on said exterior surface and said first portion of said mechanism is secured to said mount by said securement device.

9. The connector of claim 8 wherein said mechanism is a leaf spring.

10. The connector of claim 9 wherein said securement device includes an adjustable control means movable relative to said socket member to selectively urge said leaf spring between said engaged and said disengaged positions.

11. The connector of claim 9 wherein said leaf spring includes a tab projecting therefrom, said tab manually engageable from the exterior of said socket member to remove said leaf spring from said slot.

12. The connector of claim 7, wherein a cross section of said inner surface of said socket member taken along a plane perpendicular to the socket member axis is a circle, said tubular electrical conduit has a conduit axis, and a cross section of said outer surface of said electrical conduit along a plane perpendicular to said conduit axis is a circle.

13. A connector into which a tubular electrical conduit having a smooth exterior surface can be secured, comprising:

an annular socket member that includes a tubular side wall having an external surface and an internal cylindrical surface defining a socket axis, said internal surface being adapted to have a slidable fit with a tubular electrical conduit inserted into the socket member;

a slot formed in said tubular wall;

a mounting area on the external surface of the tubular wall;

a securement device; and a spring leaf detent being secured to said mounting area by said securement device, said spring leaf detent extending through said slot and being engageable with any point along the smooth exterior surface of said conduit, said spring leaf detent having a tab engageable to remove said spring leaf detent from said slot.

14. The connector of claim 13 wherein said spring leaf detent further includes a flat mounting portion and a second integral deflector planar portion, said flat mounting portion seated on said mounting area, said second integral deflector planar portion extending angularly from said flat planar mounting portion through said slot for engaging an electrical conduit inserted into the socket member by means of affixed securement of said flat mounting portion to said external surface by said securement device, said tab projecting from said second integral deflectable planar portion.

15. The connector of claim 14 wherein said securement device includes a rivet securing said flat planar mounting portion directly to said mounting area on said external surface.

16. A method for securing a conduit to a member having an inner surface defining an opening for receiving said conduit, said member further comprising flexible locking means biased toward an engaged position for locking said conduit to said member, said flexible locking means coupled to said member and having a tab manually engageable from the exterior of said member for moving said flexible locking means toward a disengaged position with said conduit, said method comprising:

engaging said tab to move said locking means into said disengaged position;

inserting the conduit into the member; and releasing said tab to allow said flexible locking means to move toward said engaged position, to biasingly contact said conduit, and to exert a resilient detent between said conduit and said member.

17. The method of claim 16 further including the step of disconnecting said conduit from said member solely by engaging said tab and moving said locking means into said disengaged position.

18. The method of claim 16 wherein said flexible locking means is a leaf spring that deflects upon movement from said engaged position.

* * * * *